(12) United States Patent
Patel

(10) Patent No.: US 6,857,075 B2
(45) Date of Patent: Feb. 15, 2005

(54) KEY CONVERSION SYSTEM AND METHOD

(75) Inventor: Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 869 days.

(21) Appl. No.: 09/734,148

(22) Filed: Dec. 11, 2000

(65) Prior Publication Data

US 2002/0071558 A1 Jun. 13, 2002

(51) Int. Cl.$^7$ ................................................. G06F 9/00
(52) U.S. Cl. ...................... 713/171; 713/168; 713/174; 380/29
(58) Field of Search ............................. 713/171, 168, 713/164, 174

(56) References Cited

U.S. PATENT DOCUMENTS

| | | | |
|---|---|---|---|
| 5,594,795 A | | 1/1997 | Dent et al. |
| 6,332,139 B1 | * | 12/2001 | Kaneko et al. ................. 707/6 |
| 6,373,952 B2 | * | 4/2002 | Asano et al. ................ 380/278 |
| 2002/0114451 A1 | * | 8/2002 | Satterfield .................... 380/37 |

FOREIGN PATENT DOCUMENTS

| WO | WO 00/76194 A1 | 12/2000 | ............ H04M/7/38 |
|---|---|---|---|

OTHER PUBLICATIONS

Menezes: "Handbook of Applied Cryptography", 1997, CRC Press LLC, US, XP 002191213, p. 331, line 5–line 9, p. 568, line 14–line 35.
European Search Report dated Mar. 26, 2002.
Menezes: "Handbook of Applied Cryptograph," 1997, CRC Press LLC, US, pp. 332–334 and 498–499.

\* cited by examiner

*Primary Examiner*—Norman Wright

(57) ABSTRACT

The present invention is a key conversion system for deterministically and reversibly converting a first key value of a first communications system into a second key value of a second communication system. For example, the key conversion system generates a first intermediate value from at least a portion of the first key value using a first random function. At least a portion of the first intermediate value is provided to a second random function to produce a second value. An exclusive-or is performed on at least a portion of the first key value and at least a portion of the second value to generate a second intermediate value. At least a portion of the second intermediate value is provided to a third random function to produce a third value. By performing an exclusive-or on at least a portion of the third value and at least a portion of the first intermediate value, the key conversion system produces at least a first portion of the second key value, and at least a second portion of the second key value is produced as the second intermediate value. The key conversion system is reversible or bi-directional in that, if the wireless unit is handed off back to the first communications system, the second key value of the second communications system is converted back to the first key value of the first communications system. For example, the key conversion system provides the at least second portion of the second key value to the third random function to produce the third value. The first intermediate value is generated by performing an exclusive-or on the first portion of the second key value and the third value. Using the second random function, the key conversion system generates the second value from the first intermediate value and produces at least a portion of the first key by performing an exclusive-or on the second value and the second portion of the second key value.

20 Claims, 11 Drawing Sheets

KEY CONVERSION SYSTEM AND METHOD

BACKGROUND OF THE INVENTION

1. Field of the Invention

The present invention relates to communications; more specifically, the conversion of keys for first and second communications systems as the wireless unit roams between the first and second communications systems.

2. Description of Related Art

FIG. 1 depicts a schematic diagram of first and second wireless communications systems which provide wireless communications service to wireless units (e.g., wireless units 12a–c) that are situated within the geographic regions 14 and 16, respectively. A Mobile Switching Center (e.g. MSCs 20 and 24) is responsible for, among other things, establishing and maintaining calls between the wireless units, calls between a wireless unit and a wireline unit (e.g., wireline unit 25), and/or connections between a wireless unit and a packet data network (PDN), such as the internet. As such, the MSC interconnects the wireless units within its geographic region with a public switched telephone network (PSTN) 28 and/or a packet data network (PDN) 29. The geographic area serviced by the MSC is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell.

Typically, each cell contains a base station (e.g. base stations 22a–e and 26a–e), which comprises the radios and antennas that the base station uses to communicate with the wireless units in that cell. The base stations also comprise the transmission equipment that the base station uses to communicate with the MSC in the geographic area. For example, MSC 20 is connected to the base stations 22a–e in the geographic area 14, and an MSC 24 is connected to the base stations 26a–e in the geographic region 16. Within a geographic region, the MSC switches calls between base stations in real time as the wireless unit moves between cells, referred to as call handoff. Depending on the embodiment, a base station controller (BSC) can be a separate base station controller (BSC) (not shown) connected to several base stations or located at each base station which administers the radio resources for the base stations and relays information to the MSC.

The MSCs 20 and 24 use a signaling network 32, such as a signaling network conforming to the standard identified as TIA/EIA-41-D entitled "Cellular Radiotelecommunications Intersystem Operations," December 1997 ("IS-41"), which enables the exchange of information about the wireless units which are roaming within the respective geographic areas 14 and 16. For example, a wireless unit 12a is roaming when the wireless unit 12a leaves the geographic area 14 of the MSC 20 to which it was originally assigned (e.g. home MSC). To ensure that a roaming wireless unit can receive a call, the roaming wireless unit 12a registers with the MSC 24 in which it presently resides (e.g., the visitor MSC) by notifying the visitor MSC 24 of its presence. Once a roaming wireless unit 12a is identified by a visitor MSC 24, the visitor MSC 24 sends a registration request to the home MSC 20 over the signaling network 32, and the home MSC 20 updates a database 34, referred to as the home location register (HLR), with the identification of the visitor MSC 24, thereby providing the location of the roaming wireless unit 12a to the home MSC 20.

After a roaming wireless unit is authenticated, the home MSC 20 provides to the visitor MSC 24 a customer profile which indicates the features available to the roaming wireless unit, such as call waiting, caller id, call forwarding, three-way calling, and international dialing access. Upon receiving the customer profile, the visitor MSC 24 updates a database 36, referred to as the visitor location register (VLR), to provide the same features as the home MSC 20. The KLR, VLR and/or the authentication center (AC) can be co-located at the MSC or remotely accessed.

If a wireless unit is roaming between wireless communications systems using different wireless communications standards, providing the wireless unit with the same features and services in the different wireless communications systems is complex if even feasible. There are currently different wireless communication standards utilized in the U.S., Europe, and Japan. The U.S. currently utilizes two major wireless communications systems with differing standards. The first system is a time division multiple access system (TDMA) and is governed by the standard known as IS-136, the second system is a code division multiple access (CDMA) system governed by the standard known as IS-95. Both communication systems use the standard known as IS-41 for intersystem messaging, which defines the authentication procedure.

In TDMA, users share a frequency band, each user's speech is stored, compressed and transmitted as a quick packet, using controlled time slots to distinguish them, hence the phrase "time division". At the receiver, the packet is decompressed. In the IS-136 protocol, three users share a given carrier frequency. In contrast, CDMA uses a unique code to "spread" the signal across the wide area of the spectrum (hence the alternative name—spread spectrum), and the receiver uses the same code to recover the signal from the noise. A very robust and secure channel can be established, even for an extremely low-power signal. Further, by using different codes, a number of different channels can simultaneously share the same carrier signal without interfering with each other. Both CDMA and TDMA systems are defined for a Second Generation (2G) and Third Generation (3G) phases with differing requirements for user information privacy or confidentiality.

Europe utilizes the Global System for Mobiles (GSM) network as defined by the European Telecommunications Standard Institute (ETSI). GSM is a TDMA standard, with 8 users per carrier frequency. The speech is taken in 20 msec windows, which are sampled, processed, and compressed. GSM is transmitted on a 900 MHz carrier. There is an alternative system operating at 1.8 GHz (DCS 1800), providing additional capacity, and is often viewed as more of a personal communication system (PCS) than a cellular system. In a similar way, the U.S. has also implemented DCS-1900, another GSM system operating on the different carrier of 1.9 GHz. Personal Digital Cellular (PDC) is the Japanese standard, previously known as JDC (Japanese Digital Cellular). PDC is a TDMA standard similar to the U.S. standard known as IS-54 protocol.

The GSM network utilizes a removable user identification module (UIM) which is a credit card size card which is owned by a subscriber, who slides the UIM into any GSM handset to transform it into "their" phone. It will ring when their unique phone number is dialed, calls made will be billed to their account; all options and services connect; voice mail can be connected and so on. People with different UIMs can share one "physical" handset, turning it into several "virtual" handsets, one per UIM. Similar to the U.S. systems, the GSM network also permits "roaming", by which different network operators agree to recognize (and accept) subscribers from other wireless communications systems or networks, as wireless units (or UIMs) move. So, British subscribers can drive through France or Germany and use their GSM wireless unit to make and receive calls (on their same UK number), with as much ease as an American businessman can use a wireless unit in Boston, Miami, or Seattle, within any one of the U.S. wireless communications system. The GSM system is defined as a Second Generation (2G) system.

The third generation (3G) enhancement of the GSM security scheme is defined in the Universal Mobile Telecommunications Service (UMTS) set of standards, and specifically for the security in the standard identified as 3GPP TS-33.102 "Security Architecture" specifications. This security scheme with slight variations will be used as a basis for the worldwide common security scheme for all 3G communications systems, including UMTS, TDMA, and CDMA.

The 2G GSM authentication scheme is illustrated in FIG. 2. This authentication scheme includes a home location register (HLR) 40, a visiting location register (VLR) 50, and a wireless unit or mobile terminal (MT) 60, which includes a UIM 62. When the mobile terminal 60 places a call, a request is sent to the home location register 40, which generates an authentication vector AV, also called "triplet" (RAND, SRES, $K_c$) from a root key $K_i$. The triplet includes a random number RAND, a signed response SRES, and a session key $K_c$. The triplet is provided to the visiting location register 50, which passes the random number RAND to the mobile terminal 60. The UIM 62 receives the random number RAND, and utilizing the root key $K_i$, the random number RAND, and an algorithm A3, calculates a signed response SRES. The UIM 62 also utilizes the root key $K_i$ and the random number RAND, and an algorithm A8 to calculate the session key $K_c$. The SRES, calculated by the UIM 62, is returned to the visiting location register 50, which compares this value from the SRES received from the home location register 40, in order to authenticate the subscriber using the mobile terminal 30.

In the GSM "challenge/response" authentication system, the visiting location register 50 never receives the root key $K_i$ being held by the UIM 32 and the home location register 40. The VLR 50 also does not need to know the authentication algorithms used by the HLR 40 and UIM 62. Also, in the GSM authentication scheme, the triplet must be sent for every phone call by the home location register 40. RAND is 128 bits, SRES is 32 bits, and $K_c$ is 64 bits, which is 224 bits of data for each request, which is a significant data load. The main focus of this description is the 64 bits long $K_c$ session ciphering key which is used for user information confidentiality. When the mobile terminal roams into another serving system while in the call, the session key $K_c$ is forwarded from the old VLR to the new target serving system.

FIG. 3 shows the UMTS security scheme which is an enhancement to the 2G GSM scheme. Similar to the GSM scheme, when the mobile terminal 90 places a call, a request is sent to the home location register 70, which sends an authentication vector—AV to the Visited Location Register (VLR) 80 which contains five elements instead of the three elements of a triplet, and therefore is called "quintuplet". This vector contains the 128 bit RAND, the 64 bits SRES, the AUTN value which carries the authentication signature of the home network, and two session security keys: the 128 bit ciphering key CK and the 128 bit integrity key IK. These latter two keys, CK and IK, are the focus of this description.

The vector is provided to the visiting location register 80, which passes the random number RAND and the AUTN to the mobile terminal 90. The UIM 92 receives the random number RAND, and utilizing the root key $K_i$, the random number RAND, and an defined algorithmic functions, validates the AUTN and calculates a signed response SRES. The UIM 92 also utilizes the root key $K_i$ and the random number RAND and defined algorithmic functions to calculate the session keys CK and IK. The SRES, calculated by the UIM 92, is returned to the visiting location register 80, which compares this value from the SRES received from the home location register 70 in order to authenticate the subscriber using the mobile terminal 90. A focus of this description are the 128 bits long session ciphering key CK and 128 bits long session integrity key IK which are used for user information confidentiality and session integrity protection. Once the subscriber is successfully authenticated, the VLR 80 activates the CK and IK received in this authentication vector. If the mobile terminal roams into another serving system while on the call, the CK and IK are sent to the new target serving system.

The 2G IS-41 authentication scheme, used in U.S. TDMA and CDMA systems, is illustrated in FIG. 4. This authentication scheme involves a home location register (HLR) 100, a visiting location register (VLR) 110, and a mobile terminal (MT) 120, which can include a UIM 122. The root key, known as the A_key, is stored only in the HLR 100 and the UIM 122. There is a secondary key, known as Shared Secret Data SSD, which is sent to the VLR 110 during roaming. SSD is generated from the A_key using a cryptographic algorithm. The procedure for generating the SSD is described elsewhere and is known to those skilled in the art. When the MT 120 roams to a visiting network, the VLR 110 sends an authentication request to the HLR 100, which responds by sending that subscriber's SSD. Once the VLR 110 has the SSD, it can authenticate the MT 120 independently of the HLR 100, or with the assistance of the HLR 100 as is known to those skilled in the art. The VLR 110 sends a random number RAND to the UIM 122 via the MT 120, and the UIM 122 calculates the authentication response (AUTHR) using RAND and the stored value of SSD in UIM 122. AUTHR is returned to the VLR 110, which checks it against the value of AUTHR that it has independently calculated in the same manner. If the two AUTHR values match, the MT 120 is declared valid. This process repeats when the wireless unit attempts to access the system, for instance, to initiate a call, or to answer a page when the call is received.

In these cases, the session security keys are also generated. To generate session security keys, the internal state of the computation algorithm is preserved after the authentication calculation. Several session security keys are then calculated by the UIM 122 and the VLR 110 using the current value of SSD. Specifically, the 520 bits Voice Privacy Mask (VPM) is computed, which is used for concealing the TDMA speech data throughout the call. This VPM is derived at the beginning of the call by the UIM and VLR, and, if the mobile roams into another serving system during the call, the VPM is sent to the new serving system by the VLR. When the call is concluded, the VPM is erased by both the UIM and the serving VLR. Likewise, the 64 bits Signaling Message Encryption Key (SMEKEY) is computed, which is used for encrypting the TDMA signaling information throughout the call. This SMEKEY is derived at the beginning of the call by the UIM and VLR, and, if the mobile roams into another serving system during the call, the SMEKEY is sent to the new serving system by the VLR. When the call is concluded, the SMEKEY is erased by both the UIM and the serving VLR.

The 2G CDMA scheme uses a similar method of key distribution, except, instead of the 520 bits VPM, it is using the 42 Least Significant Bits (LSB) of the VPM as a seed into the Private Long Code Mask (PLCM). This PLCM is used as an additional scrambling mask for the information before its spreading. The 42-bit PLCM is consistent throughout the call and is sent to the new serving system by the VLR if the mobile roams into another serving system. The SMEKEY is used in the same way as in the TDMA based scheme.

The IS-41 3G security scheme uses the UMTS security scheme, which is based on the delivery of the 128-bits ciphering key CK and 128-bits integrity key IK to the visited system VLR, while the same keys are computed by the UIM.

Key conversions as a wireless unit roams between communications systems should be performed in a way that even if lower security of 2G schemes and algorithms is compromised and partial keys are recovered by the intruder, the 3G session keys would still maintain the same level of security. Such conversions will allow a subscriber to "roam globally" maintaining the security of communications data and integrity of communications session.

SUMMARY OF THE INVENTION

The present invention is a key conversion system for deterministically and reversibly converting a first key value of a first communications system into a second key value of a second communication system. For example, the key conversion system generates a first intermediate value from at least a portion of the first key value using a first random function. At least a portion of the first intermediate value is provided to a second random function to produce a second value. An exclusive-or is performed on at least a portion of the first key value and at least a portion of the second value to generate a second intermediate value. At least a portion of the second intermediate value is provided to a third random function to produce a third value. By performing an exclusive-or on at least a portion of the third value and at least a portion of the first intermediate value, the key conversion system produces at least a first portion of the second key value, and at least a second portion of the second key value is produced as the second intermediate value. The key conversion system is deterministic in that, given a first key value, a wireless unit and the wireless communications system will determine the same second key value without requiring an exchange of information.

The key conversion system is reversible or bi-directional in that, if the wireless unit is handed off back to the first communications system, the second key value of the second communications system is converted back to the first key value of the first communications system. For example, the key conversion system provides the at least second portion of the second key value to the third random function to produce the third value. The first intermediate value is generated by performing an exclusive-or on the first portion of the second key value and the third value. Using the second random function, the key conversion system generates the second value from the first intermediate value and produces at least a portion of the first key by performing an exclusive-or on the second value and the second portion of the second key value. The key conversion system provides improved security because even if almost all of the second key value is known, the first key value cannot easily be recovered. Similarly, if almost all of the first key value is known, the second key value is not easily recovered.

BRIEF DESCRIPTION OF THE DRAWINGS

Other aspects and advantages of the present invention may become apparent upon reading the following detailed description and upon reference to the drawings in which.

DETAILED DESCRIPTION

An illustrative embodiment of the key conversion system according to the principles of the present invention is described below which provides an improved key conversion for a wireless unit which roams between first and second wireless communications systems. The key conversion system deterministically and reversibly converts an m bit key value of a first communications system into an n-bit key value of a second communication system. In certain embodiments, the key conversion system use three random functions f, g and h where random functions f and g map an m bit input string into an n-m bit string resembling a random number, and the random function h maps an n-m bit string into an m bit string resembling a random number. A random function maps inputs to outputs such that the outputs are unpredictable and random looking given the input. In the embodiments described below, the random functions are random oracles where every time an input is given it maps to the same output. Additionally, in the embodiments described below, the random functions are publicly known. For example, the random functions are known by the wireless communications system(s) involved in the intersystem handoff and the wireless unit.

The key conversion system is deterministic in that, given an m-bit key value, a wireless unit and the wireless communications system will determine the same n-bit key value without requiring an exchange of information. The key conversion system is reversible or bi-directional in that, if the wireless unit is handed off back to the first communications system, the n bit key of the second communications system is converted back to the m-bit key of the first communications system. The key conversion system provides improved security because even if almost all of the n bit key value is known, the m bit key value cannot easily be recovered. Similarly, if almost all of the m bit key value is known, the n bit key value is not easily recovered.

Figure 1:
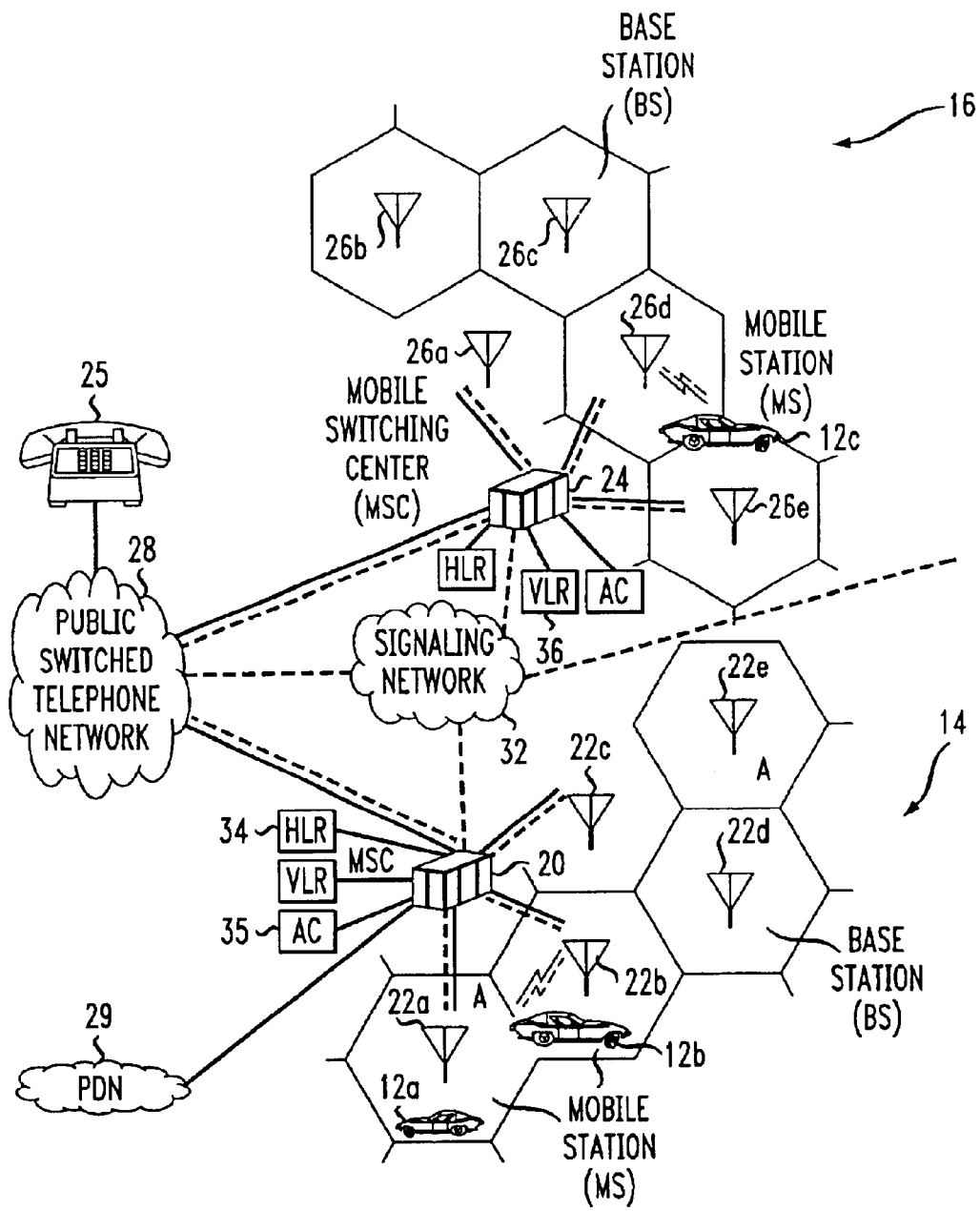
FIG. 1 shows a general diagram of wireless communications systems for which the key conversion system according to the principles of the present invention can be used.
Figure 2:
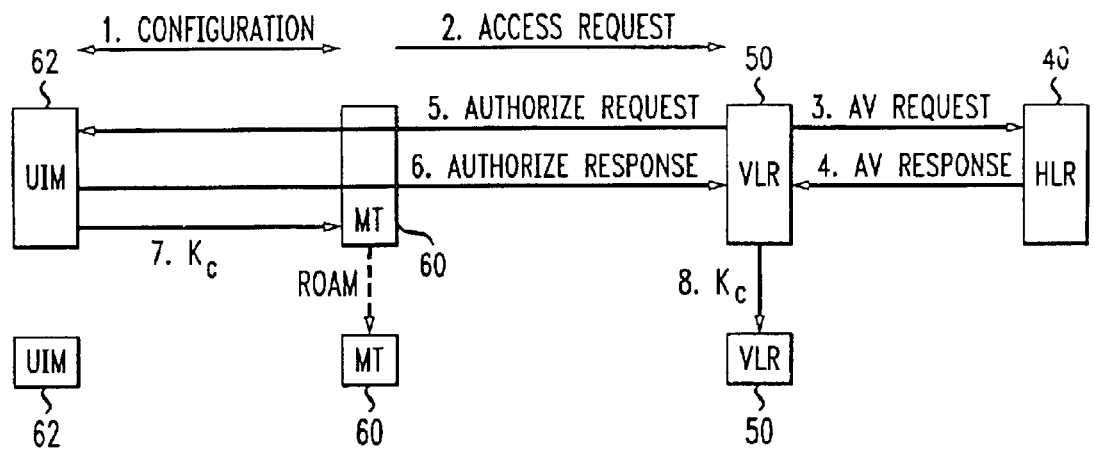
FIG. 2 is a block diagram illustrating the basic components of the prior art 2G global system for mobiles (GSM) network and security messages transmitted in the 2G GSM network.
Figure 3:
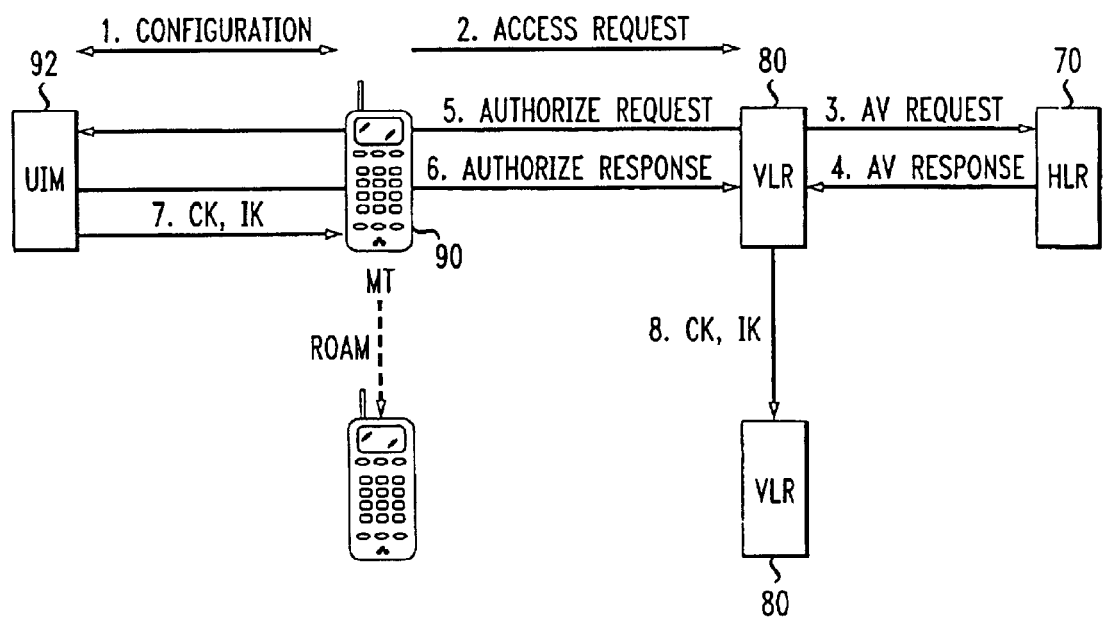
FIG. 3 is a block diagram illustrating the basic components of the prior art 3G UMTS network and messages transmitted in the 3G UMTS network.
Figure 4:
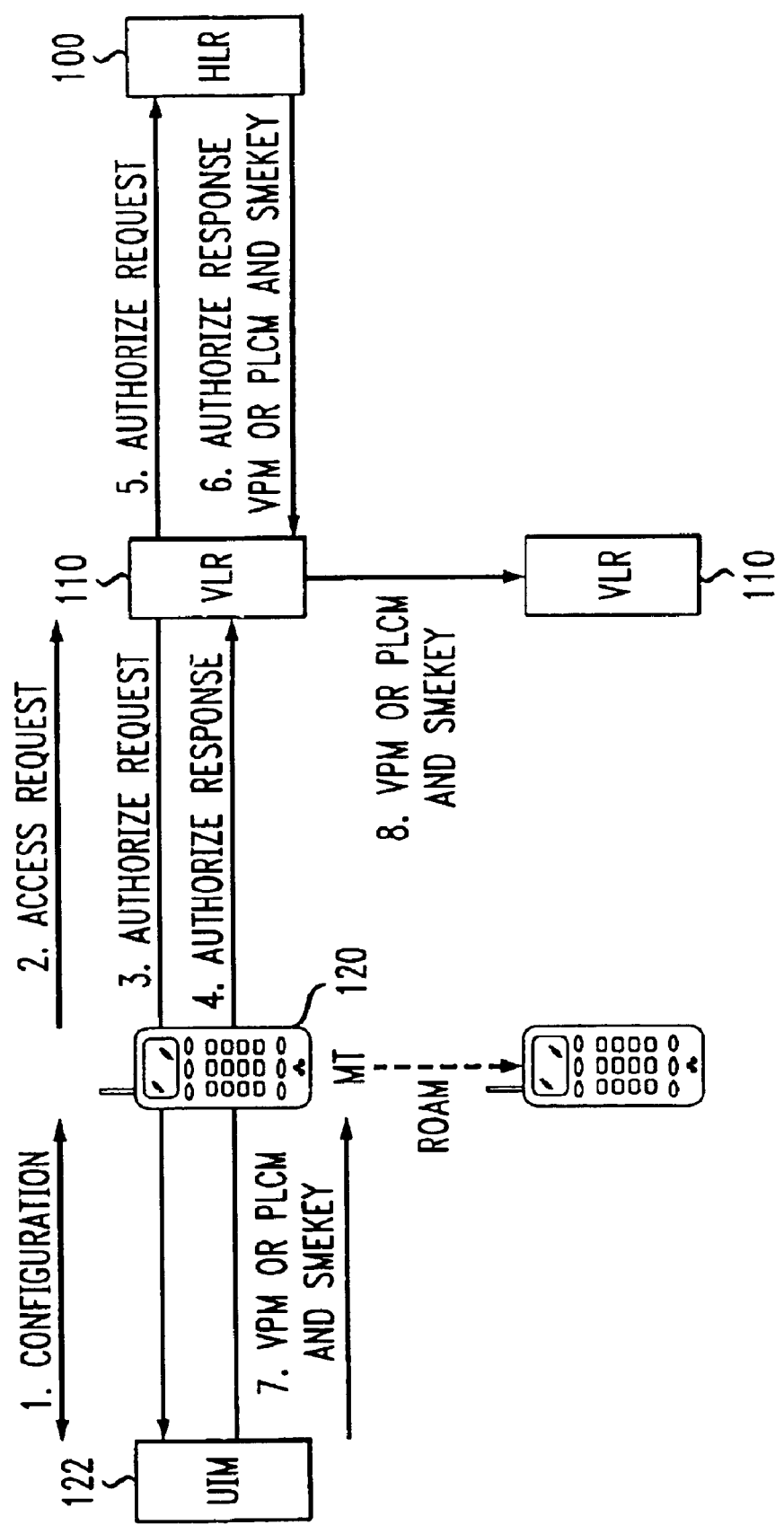
FIG. 4 is a block diagram illustrating the basic components of the prior art 2G IS-41 network and messages transmitted in the prior art 2G IS-41 network.
Figure 5:
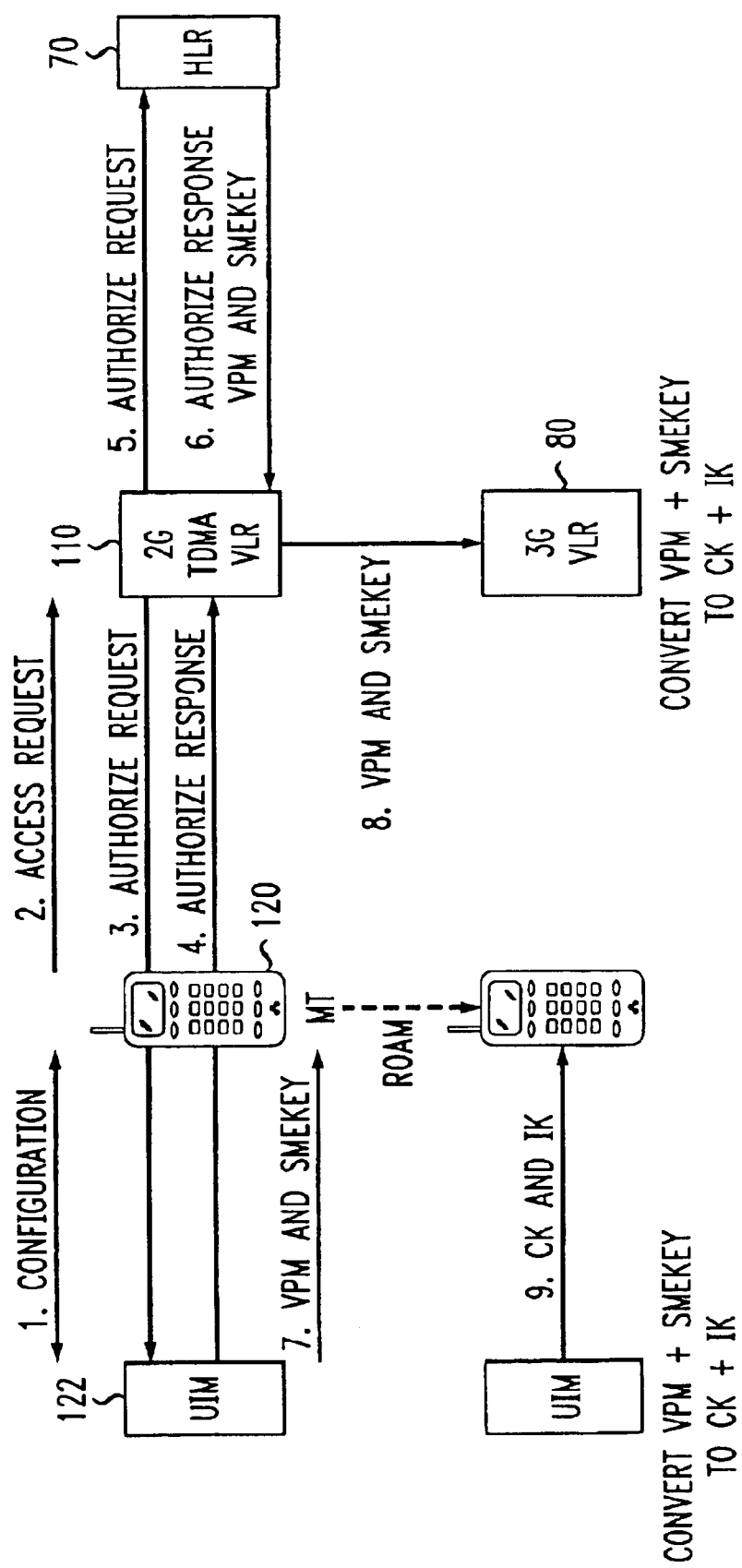
FIG. 5 is a block diagram illustrating how a user roams from a 2G TDMA network into a generic 3G network.
Figure 6:
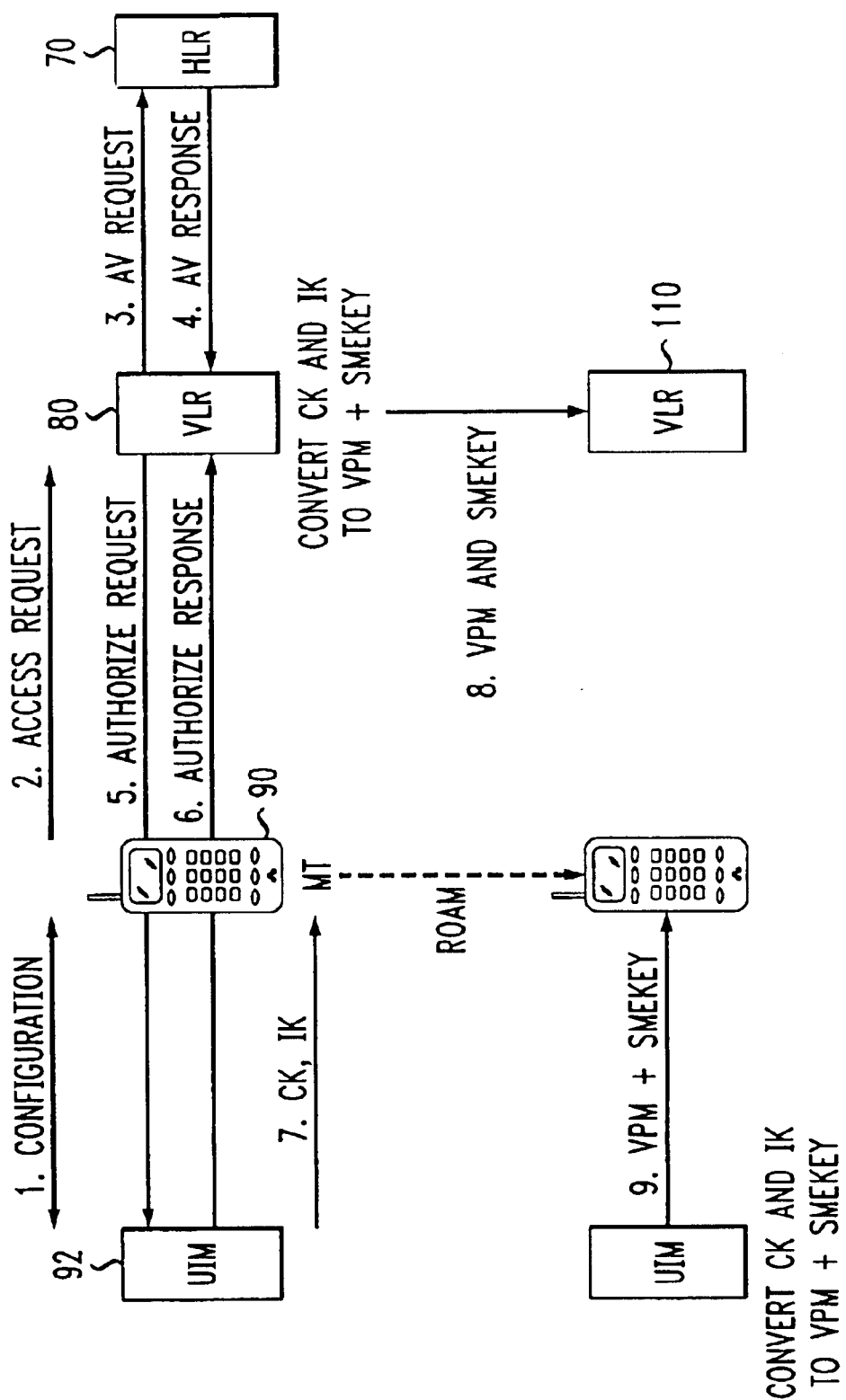
FIG. 6 is a block diagram illustrating how a user roams from a generic 3G network into a 2G TDMA network.

Depending on the embodiment, the key conversion system can provide secure, deterministic and bi-directional key conversion when a wireless unit roams between two wireless communications system, such as between an older communications system and a newer communications system. For example where the same reference numerals indicate like components, the IS-41 3G security scheme of FIG. 5 converts, at the VLR 80 and at the wireless unit 120 (or 122), the 520-bits VPM in combination with the 64-bits SMEKEY received from the VLR 110 to the 128-bit CK and/or 128-bit IK when the wireless unit roams into the 3G system from the 2G TDMA system. Conversely, as shown in FIG. 6, the IS-41 3G security scheme converts, at the VLR 80 and the wireless unit 90 (or 92), the 128-bit CK and/or the 128-bit IK to the 520-bits VPM in combination with the 64-bits SMEKEY when the wireless unit roams into the 2G TDMA system from the 3G system. The VLR 80 provides the VPM and the SMEKEY to the VLR 110.

Figure 7:
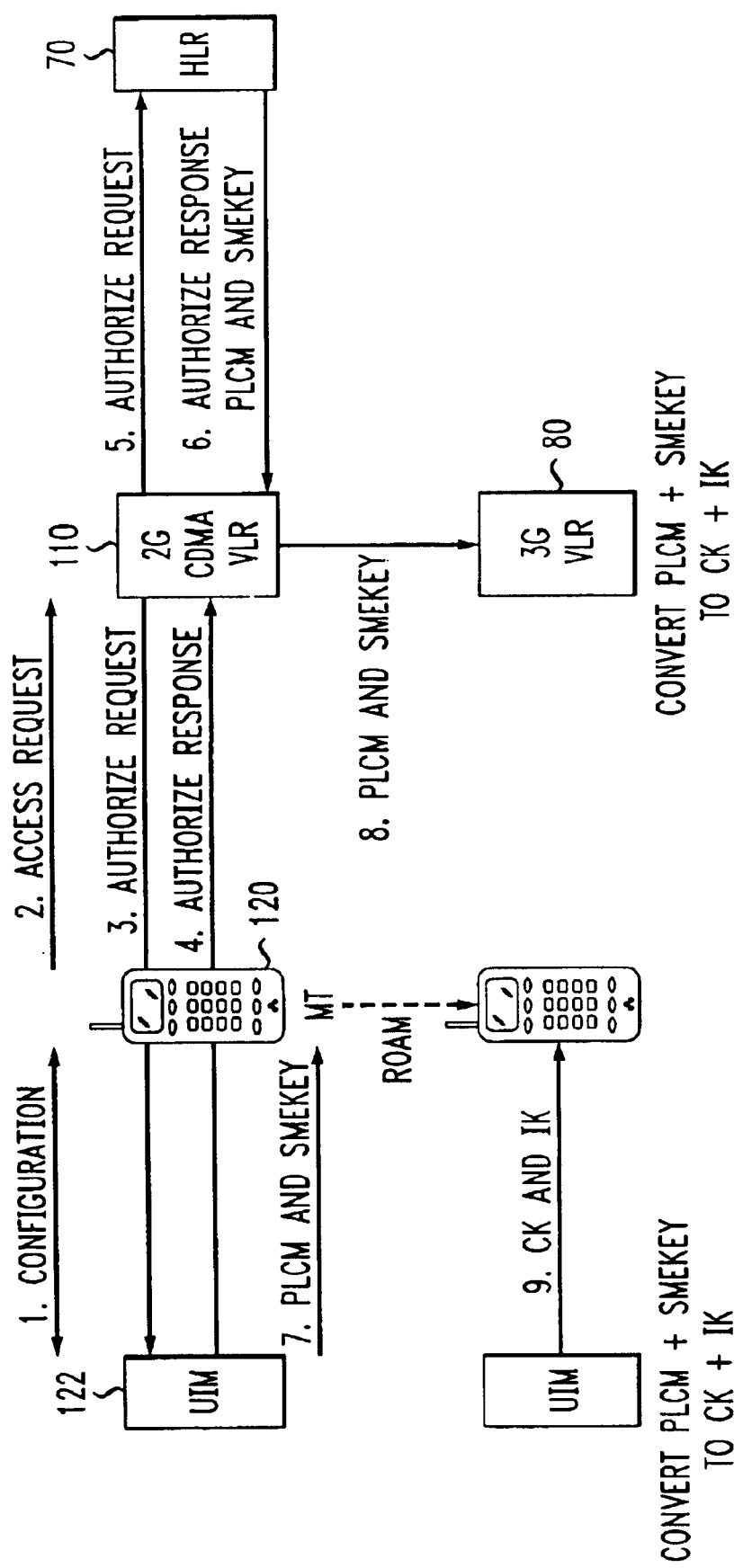
FIG. 7 is a block diagram illustrating how a user roams from a 2G CDMA network into a generic 3G network.
Figure 8:
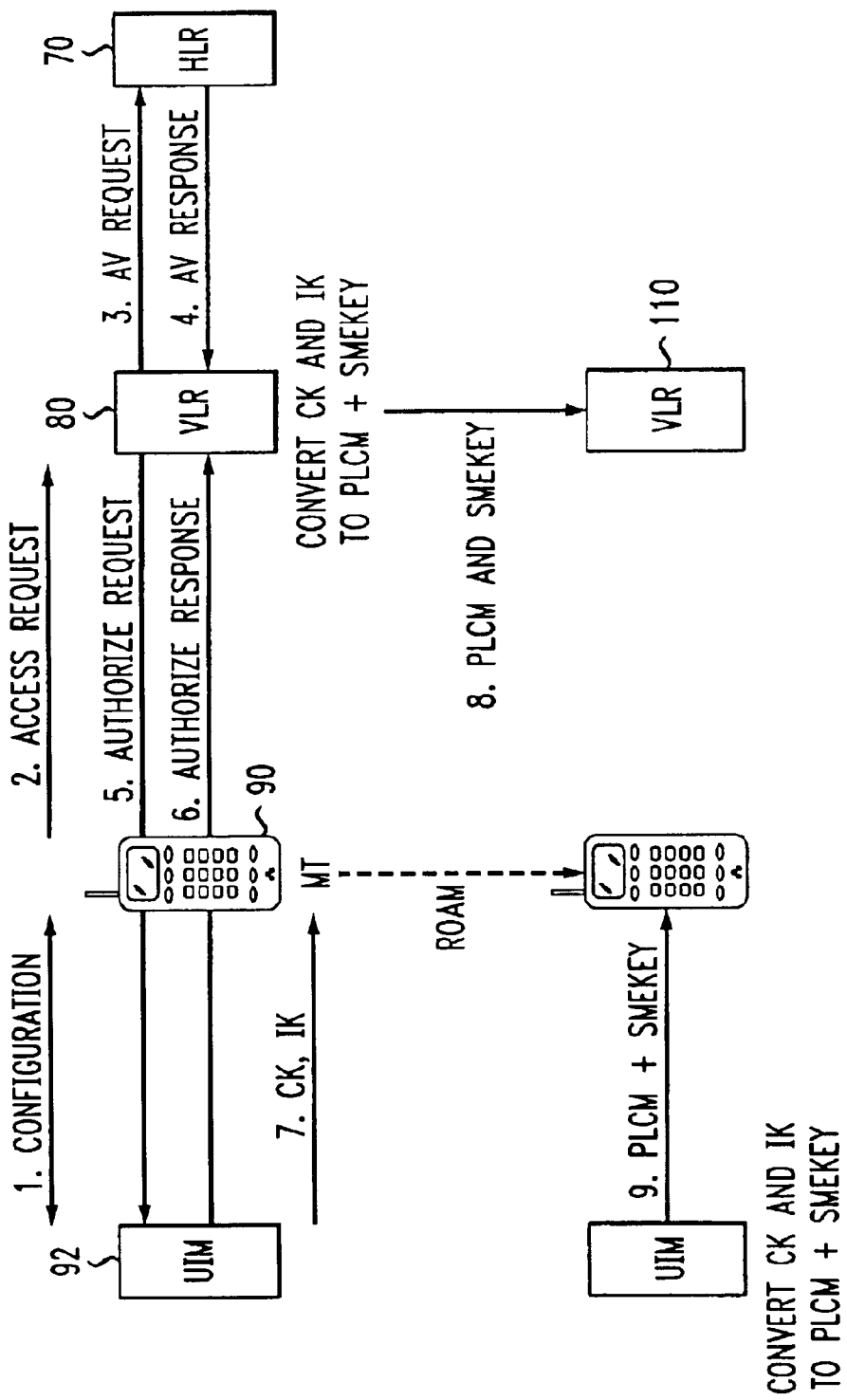
FIG. 8 is a block diagram illustrating how a user roams from a generic 3G network into a 2G CDMA network.

As shown in FIG. 7, IS-41 3G security scheme converts, at the VLR 80 and at the wireless unit 120 (or 122), the 42-bits PLCM in combination with the 64-bits SMEKEY received from the VLR 110 to the 128-bit CK and/or the 128-bit IK when the wireless unit roams into the 3G system from the 2G CDMA system. Conversely, as shown in FIG. 8, the IS-41 3G security scheme converts, at the VLR 80 and at the wireless unit 90 (or 92), the 128-bit CK and 128-bit IK to the 42-bits PLCM in combination with the 64-bits SMEKEY when the mobile roams into the 2G CDMA system from the 3G system. The VLR 80 provides the PLCM and the SMEKEY to the VLR 110.

Figure 9:
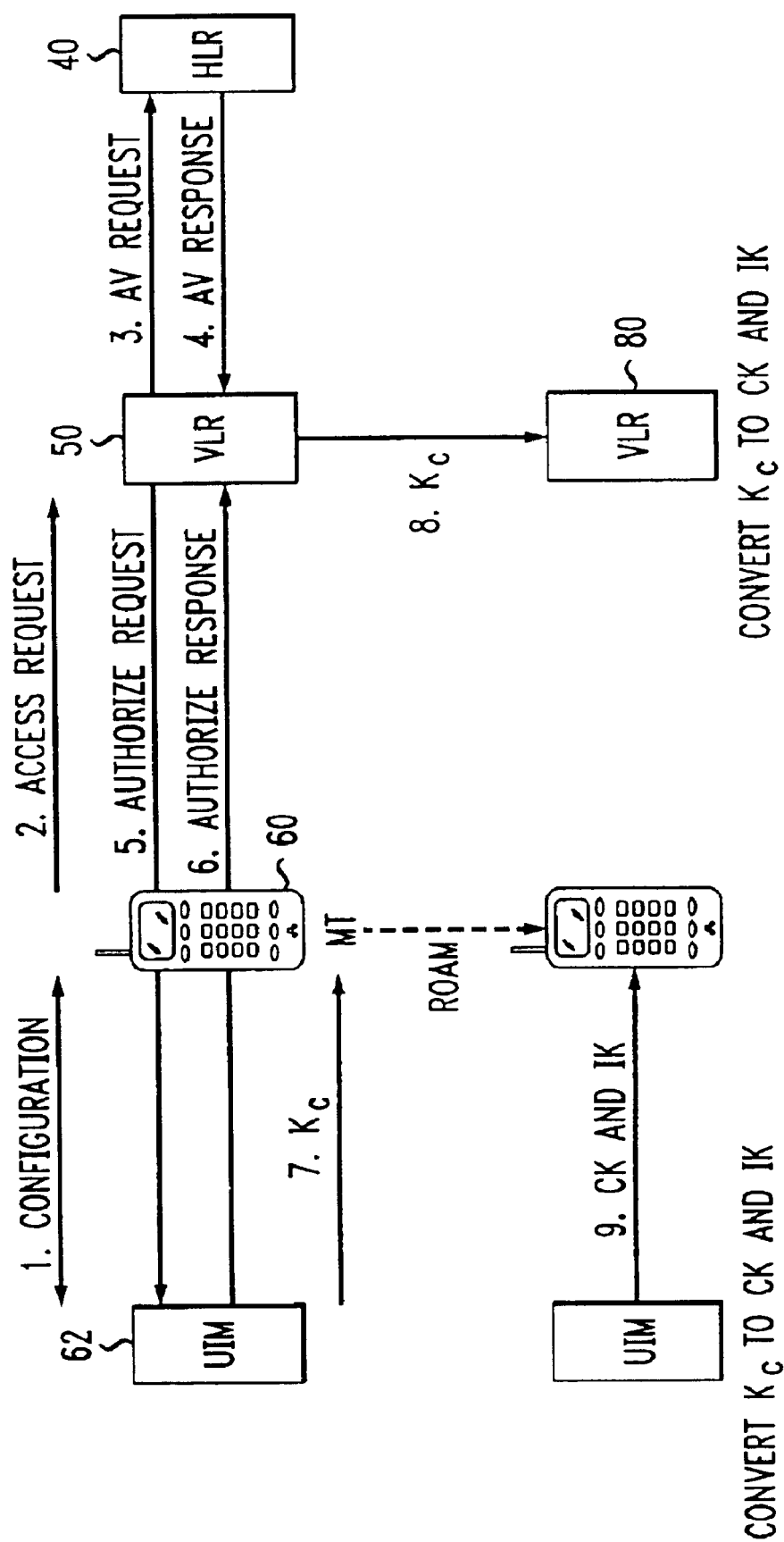
FIG. 9 is a block diagram illustrating how a user roams from a 2G GSM network into a generic 3G network.
Figure 10:
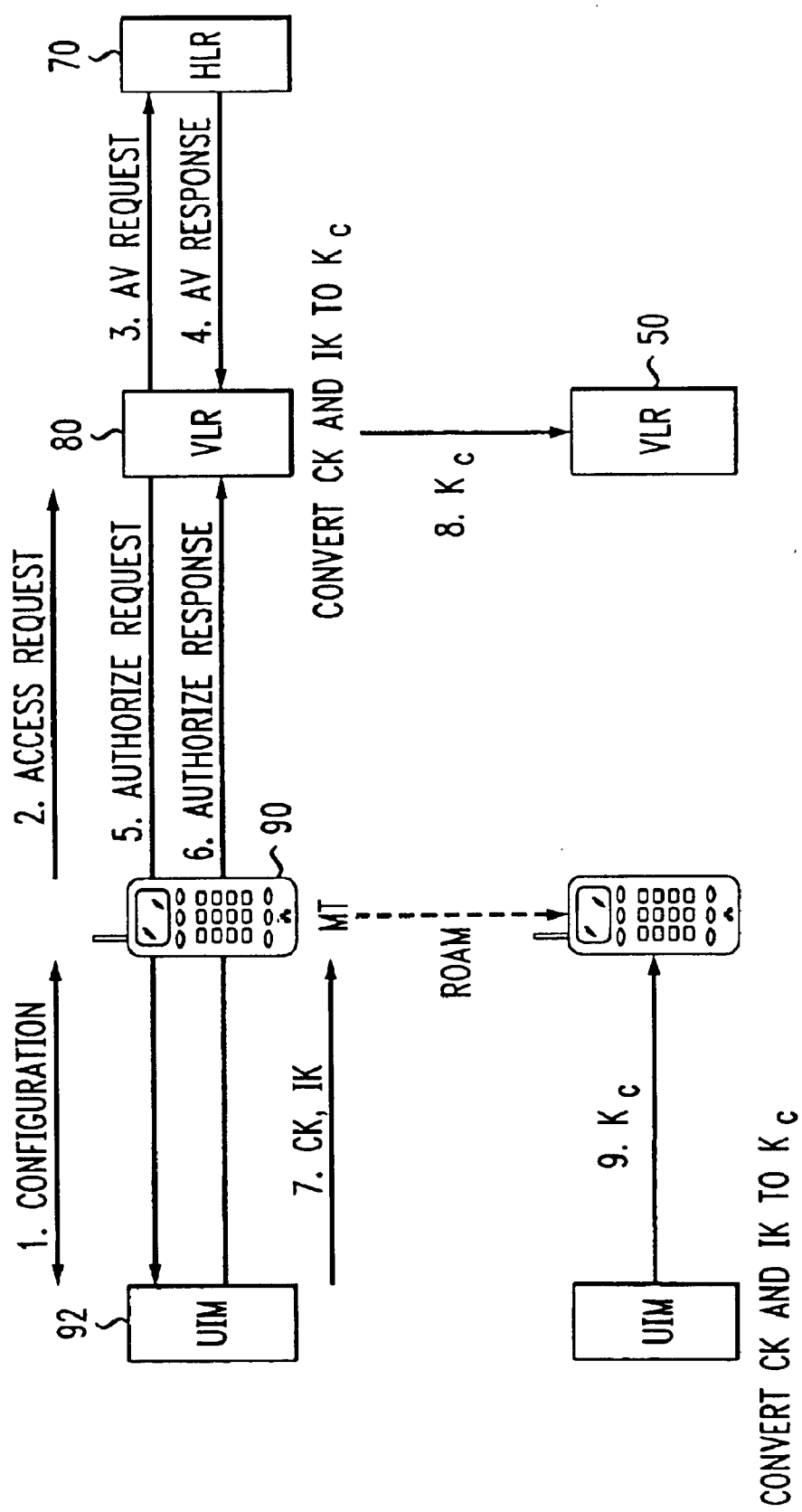
FIG. 10 is a block diagram illustrating how a user roams from a generic 3G network into a 2G GSM network.

As shown in FIG. 9. the UMTS 3G security scheme converts, at the VLR 80 and at the wireless unit 60 (or 62), the 64-bit Kc received from the VLR 50 to the 128-bit CK and/or the 128-bit IK when the wireless unit roams into the 3G UMTS system from the 2G GSM system. Conversely, as shown in FIG. 10, the UMTS 3G security system converts, at the VLR 80 and at the wireless unit 90(or 92), the 128-bit CK and/or the 128-bit IK to the 64-bit $K_C$ when the wireless unit roams into the 2G GSM system from the 3G UMTS system. The VLR 80 provides the $K_C$ to the VLR 50.

Accordingly, in certain embodiments, a wireless unit that supports enhanced subscriber authentication (ESA) and enhanced subscriber privacy (ESP) in a first communications system, such as a newer 3G communications system, may implement multiple privacy modes to enable the wireless unit to provide privacy using older algorithms in a second communications system, such as an older 2G TDMA communications system. Such a wireless unit can provide other forms of privacy after intersystem handoff to an MSC for an older second communications system that does not support ESP. When handoff to the older second communications system is required, the key conversion system can convert the key values for the newer first communications system to the privacy keys needed for the older privacy algorithms supported by the older second communications system. The keys for the second communications system can be sent to the target MSC of the second communications system from the MSC of the first communications system. Since the key conversion system is deterministic, the wireless unit will also have the keys for the second communications system by performing the same conversion as the first communication system using the key conversion system of the present invention.

The key conversion system maps a key(s) from a first system into a key(s) of a second system and back again. For example, when performing an intersystem handoff between a 3G communications system and a 2G TDMA system, the key conversion system can map a cipher key CK into a VPMASK/SMEKEY (VS) pair. In this embodiment, the key conversion function possesses the following properties: 1) A 128 bit CK is mapped into a 584 bit VS; 2) The function is reversible and maps back a 584 bit VS into a 128 bit CK; and 3) The function is secure in the sense that partial knowledge of the 584 bit key will not allow the adversary to recover the CK, nor will partial knowledge of 128 bit key CK allow the adversary to recover the 584 bit VS. In certain instances, for example when the call originates in a first communication system having a larger key value than the target second communications system, the conversion system maps the key value of the first communication system to a key value of a second communications system. However, if the wireless unit returns to the first communications system, the key conversion system maps the second key value to a subsequent key value for the first communications system which is not necessarily the same as the original key value. Subsequent handoffs back to the first communications system from the second communications system produce a key value which is the same as the subsequent key value.

For example, when performing an intersystem handoff for a call originating with a 2G TDMA system to a 3G system, the key conversion system can map VPMASK/SMEKEY (VS) pair into a cipher key CK. In this embodiment, the key conversion function maps the 584 bit VS into the 128 bit CK. If the wireless unit is handed back to the 2G TDMA system, the conversion system maps back the 128 bit CK into the 584 bit VS, but the new 584 bit VS may not be the same as the original 584 bit VS. Subsequent handoffs to the 2G TDMA system from the 3G system will maintain the new 584 bit VS. Although this should not effect the security or operation of the wireless unit, the 128 bit CK is maintained the same all along in this embodiment.

In this embodiment, the key conversion system includes conversion functions available at the MSC in the newer system and at the wireless unit which will convert key values, for a first communications system, such as ESP keys, into key values of a second communications system, such as keys used for older privacy algorithms. In this example, the conversion function should convert the 128 bit CK key in the new first communication system to VPMASK/SMEKEY (VS) keys for the older second communication system. VPMASK is composed of 260 bits mask for each direction and SMEKEY is 64 bits long, for a total of 584 bits to be used by the older communication system. In case of an intersystem handoff from the old communication system to the new communication system, it may be useful for the conversion function to be reversible. The old communication system does not know about the new communication system and will transfer all 584 bits to the new communication system. The new communication system upon receiving the 584 bit key will realize that it needs to recover the 128 bit CK, and hence will compute the CK from the 584 bit key.

The VS keys created at the wireless unit and the MSC should be the same. This means the calculation of the VS keys must be based solely on CK and any other quantities known by both the MSC and the wireless unit. Otherwise, any new quantities (e.g. random number) would have to be exchanged between the wireless unit and the MSC prior to the conversion. The key conversion system does not require the exchange of information between the wireless unit and the new MSC and deterministically maps a CK to VS keys and VS keys to a CK key.

Additionally, weaknesses in the old communications system should not make the new communications system weak. One can achieve this by making the key conversion function cryptographically one way, so that even if the entire key of the old communication system, such as the VS key in this example, is revealed, the adversary cannot recover the key of the new communication system, such as the CK key in this example. However, this will make the system non-reversible and, as previously noted, the key conversion system should be reversible. Nevertheless, the key conversion system can be reversible and still provide almost all of the security of a non-reversible function. The security of the key conversion system in this example prevents an adversary from recovering any part of the CK key even if almost all of the VS key is revealed except a small part. The adversary can guess the small part, but he should not be able to do any better. This aspect is important because parts of VPMASK may be somewhat easy to recover, and the entire VPMASK may be easier to recover than the SMEKEY. Yet if some part of the old system is hard to recover than the adversary will not know anything about CK. A similar security can apply to CK so that a partial knowledge of CK should not tell the adversary anything about VS.

In certain embodiments, the conversion function has two modes, the forward conversion and the reverse conversion. In the example of roaming from the 3G communications system to the 2G TDMA communications system, the forward conversion takes the 128 bit randomly created CK key and expands it to 584 bit VS key. The reverse conversion function takes the 584 bit VS keys and maps it to a 128 bit CK key. In this embodiment, the forward conversion function is composed of 3 random functions f, g and h which map a given input into a random output. In this embodiment, these are not secret functions but public random functions known to everybody, including the adversary. These public random functions are referred to as random oracles in the literature. These random oracles can be implemented using hash functions and block ciphers as described below. In this example, the three random functions are f, g, h where f and g map a 128 bit input into a 456 bit random value, and h maps a 456 bit input into a 128 bit random value.

Figure 11:
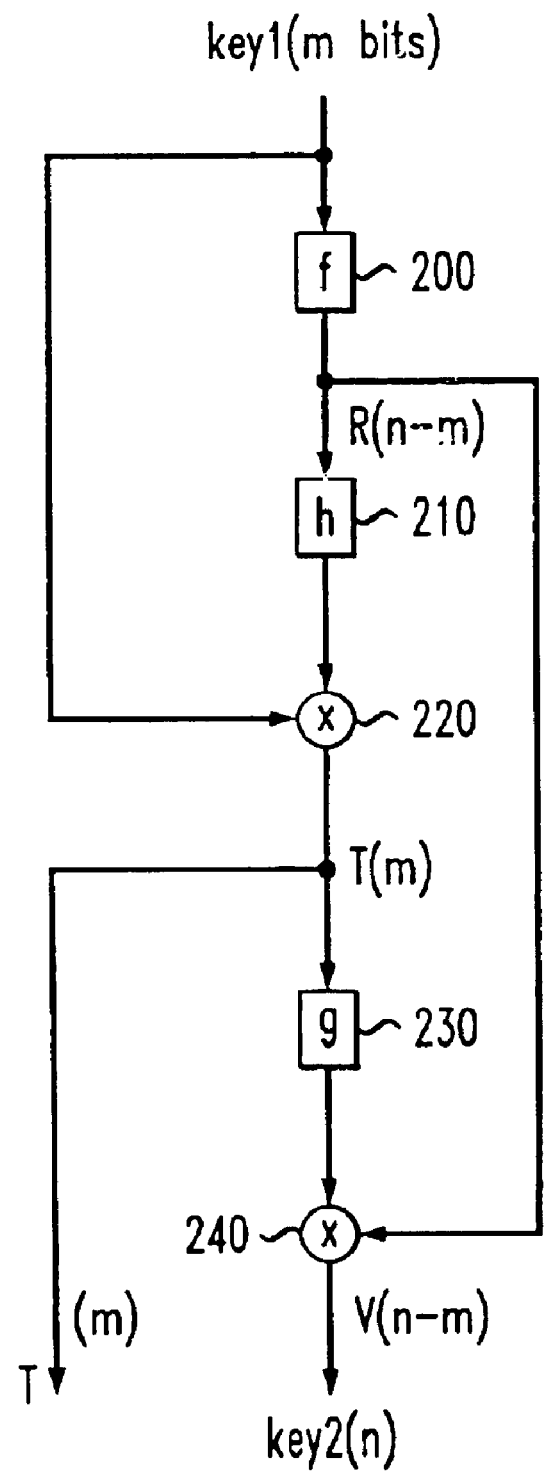
FIG. 11 is a flow diagram of an embodiment of the forward conversion for the key conversion system according to principles of the present invention.

FIG. 11 shows a flow diagram of an embodiment of the forward conversion of the key conversion system for converting an m-bit key value KEY1 of a first communications system into an n-bit key value KEY2 of a second communications system. The m bit KEY1 is provided to a random function f (block 200) which maps an m-bit string into an n-m bit random number or first intermediate value R. In the example of roaming from the 3G communications system to the 2G TDMA communications system, the conversion system converts a 128 bit key CK into a 584 bit key (VPMASK, SMEKEY). The 128 bit key CK is provided to the random function f (200) which maps the 128 bit CK into a 456 bit random number or first intermediate value R. The intermediate value R is provided to a random function h (block 210) which maps an n-m bit string into an m bit random number. The m-bit output of the function h (210) is subject to an exclusive-or (XOR 220) with the m bit KEY1 to produce an m-bit second intermediate value T. In the example of roaming from the 3G communications system to the 2G TDMA communications system, the 456 bit intermediate value R is provided to the function h (210). The function h (210) maps the 456 bit value R to a 128 bit random number which is XORed with the 128 bit CK to produce a 128 bit second intermediate value T.

In the embodiment of FIG. 11, the m-bit intermediate value T is provided to a random function g (block 230). The random function g (block 230) maps an m bit string to an n-m bit random number which is subject to an exclusive-or (XOR 240) with the n-m bit intermediate value R to produce an n-m bit key value V which can be used as a key, keys or portion(s) of key(s). In this embodiment, the value V is a portion of the value KEY2 which can be used as a key, keys or portion(s) of key(s). In this embodiment, the n bit key KEY2 includes the n-m bit value V along with the m bit second intermediate value T. In the example of roaming from the 3G communications system to the 2G TDMA communications system, the random function g (230) maps the 128 bit intermediate value T into a 456 bit random number which is subject to the exclusive-or (XOR 240) with the 456 bit intermediate value T to produce the 456 bit key value V. The 456 bit value V and the 128 bit intermediate value T form the 584 bit key value KEY2 which in this example can be divided into the VPMASK and the SMEKEY for 2G TDMA systems.

The forward conversion of the CK of the 3G system to the VPMASK and SMEKEY of the 2G TDMA system can be written according to the following steps.
1. R=f(CK) /*create a 456 bit value from 128 bit CK by applying f*/
2. T=h(R) XOR CK /*create a 128 bit value using h*/
3. V=g(T) XOR R /*create a 456 bit value using g*/
4. Output T,V /*output the 584 bit value*/

Figure 12:
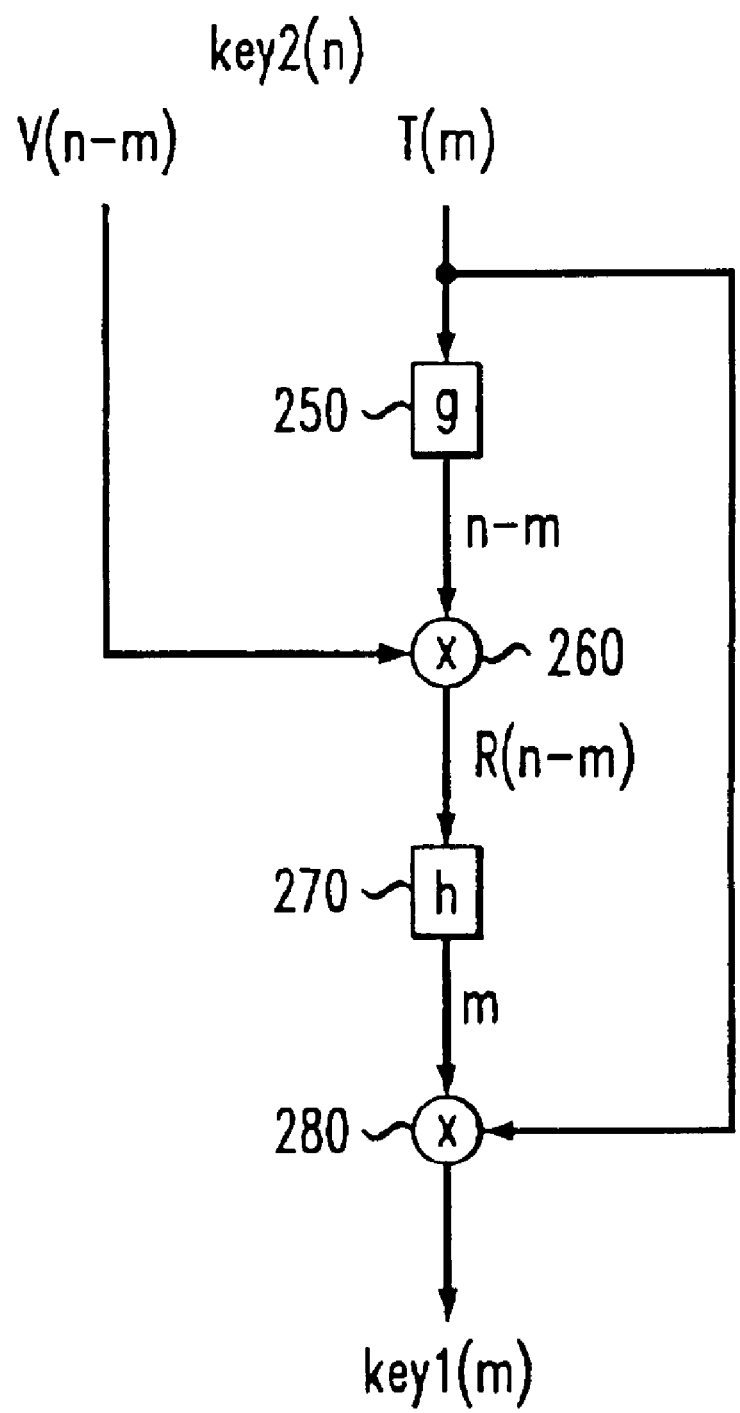
FIG. 12 is a flow diagram of an embodiment of the reverse conversion for the key conversion system according to principles of the present invention.

FIG. 12 shows a flow diagram of an embodiment of the reverse conversion of the key conversion system for converting the n-bit key value KEY2 of the second communications system back into the m-bit key value KEY1 of the first communications system. In this embodiment, the n bit key value KEY2 is divided into an n-m bit first portion or value V and an m-bit second portion or value T. The m-bit value T is provided to the random function g (block 250) which maps an m-bit string into an n-m bit random number. The n-m bit random number is subjected to an exclusive-or (XOR 260) with the n-m bit key value V to produce the n-m bit first intermediate value R. In the example where the wireless unit roams back to the 2G TDMA system from the 3G system, the conversion system converts the 584 bit key (VPMASK, SMEKEY) into a 128 bit key CK. The 128 bit key value portion T is provided to the random function g (250) which maps the 128 bit T into a 456 bit random number. The 456 bit random number exclusive-ORed (XOR 260) with the 456 bit key value V to produce the 456 bit first intermediate value R.

In the embodiment of FIG. 12, the n-m bit first intermediate value R is provided to a random function h (block 270). The random function h (block 270) maps an n-m bit string to an m bit random number which is subject to an exclusive-or (XOR 280) with the m bit key value T to produce an m bit key value KEY1 which can be used as a key, keys or portion(s) of key(s). In the example where the wireless unit roams back to the 2G TDMA system from the 3G system, the random function h (270) maps the 456 bit intermediate value R into a 128 bit random number which is subject to an exclusive-or (XOR 280) with the 128 bit key value T to produce the 128 bit key CK.

The reverse conversion of the VPMASK and SMEKEY of the 2G TDMA system to the CK of the 3G system can be written according to the following steps.
1. Set T,V to 584 bit input /*T is 128 bit part, V is 456 bit part*/
2. R=g(T) XOR V /*create 456 bit value R using T, V*/
3. CK=h(R) XOR T The random functions f, g and h can be implemented using hash functions and/or block ciphers. To implement the random functions f, g, and h, which can be referred to as random oracles, cyptographic hash functions, such as the functions known as known as SHA-1, MD5, RIPE-MD, can be used to instantiate the random functions f, g, h. A hash function can be typically characterized as a function which maps inputs of one length to outputs of another, and given an output, it is not feasible to determine the input that will map to the given output. Moreover, it is not feasible to find two inputs which will map to the same output. In using a SHA-1 hash function, each call to the SHA-1 hash function has a 160 bit initial vector (IV) and takes a 512 bit input or payload which is mapped into a 160 bit output. The IV is set to the IV defined in the standard for SHA-1 hash function. The payload will contain various input arguments: SHA (Type, Count, Input, Pad) where Type is a byte value which defines the various functions f, g, h. Function f and g will call SHA multiple times, and Count is a byte value which differentiates the multiple calls. Input is the input argument to the functions f, g, or h. Pad is zeroes to fill the remaining bit positions in the 512 bit SHA payload. Below is an example procedure for implementing the random function f, g and h using a hash function routine referred to as SHA.

SHA(type,count,input,pad)
f(CK): SHA(1, 1, CK, pad)
SHA(1, 2, CK, pad)
SHA(1, 3, CK, pad) mod $2^{136}$
h(R): SHA(2, 1, R, pad) mod $2^{128}$
g(T): SHA(3, 1, T, pad)
SHA(3, 2, T, pad)
SHA(3, 3, T, pad) mod $2^{136}$ Block ciphers, like AES, can be used to create functions f, g, and h.

f(CK): $E_{CK}(1); E_{CK}(2); E_{CK}(3); E_{CK}(4)$ mod $2^{72}$;
h(R): $E_{K0}(R1\ XOR\ 5)\ XOR\ E_{K0}(R2\ XOR\ 6)\ XOR\ E_{K0}(R3\ XOR\ 7)\ XOR\ E_{K0}(R4\ XOR\ 8)$
g(T): $E_T(9); E_T(10); E_T(11); E_T(12)$ mod $2^{72}$;

where in f(CK), CK is used as the key in the block cipher and 512 bit stream is produced by encrypting 1 . . . 4 in counter mode. The last encryption is truncated from 128 bit to 72 bit to get the needed 456 bits. In h(R), a public key K0 is used to encrypt the parts of 456 bit R and the resulting ciphertexts are exclusive-ored together. R1, R2, and R3 are 128 bit values and R4 is the remaining 72 bit value of R, padded with zeroes to complete 128 bits.

Thus, the key conversion system provides bi-directional, deterministic and secure conversion of a key(s) or portion(s) thereof between first and second communications systems. The key conversion system is secure in the forward direction in that given most of the output KEY2 (for example, T,V), an adversary cannot recover KEY1 (for example, CK). In the example with the 2G TDMA and 3G systems, if all of T and most V except say 64 bits are known, then parts of R can be recovered, but not all of R by calculating R=g(T) XOR V. An attempt can be made to recover some of CK by performing CK=h(R) XOR T. However, since all of R is not known, even a bit of information about h(R) cannot be recovered, assuming h is a random function. Hence no information can be recovered about CK. Similarly, if all of V and part of T are known, except say 64 bits of T, then no information about CK can be recovered. Since we do not know all of T, the intermediate value R cannot be calculated using g(T) XOR V. Thus without the intermediate value R, no progress can be made in recovering any information about CK.

Similarly, the key conversion system is secure in the reverse direction in that given most of the output KEY1 (for example, CK), an adversary cannot recover KEY2 (for example, T, V). In the example with the 2G TDMA and 3G systems, if a part of CK is known, no information about T,V can be recovered. Since we do not know all of CK, the intermediate value R cannot be calculated using f(CK). Thus without the intermediate value R, no progress can be made in recovering any information about T,V.

In addition to the embodiment(s) described above, the key conversion system according to the principles of the present invention can be used which omit and/or add input parameters and/or random functions or other operations and/or use variations or portions of the described system. For example, the key conversion system has been described as converting between n bit key of a first communication system and an m bit key of a second communications system using random oracles f, g and h where the random oracles f and g map an m bit string to a n-m bit random number and the random oracle h maps a n-m bit string to an m bit random number. However, different random functions can be used as well as different or additional functions which map x bit strings to y bit random numbers and/or map y bit strings to x bit random numbers where x or y can be equal to n-m or m. Additionally, the m bit key value for the first communications system can be a key, keys or portion(s) thereof, and the n bit key value for the second communications system can be a key, keys or portion(s) thereof. For example, the example with the 2G TDMA and 3G systems, the conversion is between the 128 bit CK of the 3G system and the 584 bit key value for the SMEKEY and VPMASK of the 2G TDMA system, but the conversion could be between a 256 bit key value of CK and IK of the 3G system and the 584 bit key value for the SMEKEY and VPMASK of the 2G TDMA system.

In the example described above, a forward conversion is from the m bit key value of the first communications system to the n bit key value of the second communications system where the first communications system corresponds to the new system and the second communications corresponds to the old system and where m<n. However, depending on the embodiment, the first communications system can be older, and the second communications system is newer. Alternatively, the forward conversion can be the conversion of the smaller size key value of one communications system to the larger bit size key value of another communications system, and the reverse conversion is the conversion of the larger bit size key value to the smaller size key value. Depending on the embodiment, the conversion of different, larger, smaller and/or the same size(s) of key value(s) between the different communications systems are possible.

Furthermore, the key conversion system can be used to handle the intersystem handoffs described in the FIGS. 5–10 to convert a key, keys or portion(s) thereof from one communications system to the key, keys or portion(s) thereof of another communications system. It should be understood that different notations, references and characterizations of the various values, inputs and architecture blocks can be used. For example, the functionality described for the key conversion system can be performed in a home authentication center, home location register (HLR), a home MSC, a visiting authentication center, a visitor location register (VLR) and/or in a visiting MSC. Moreover, the key conversion system and portions thereof can be performed in a wireless unit, a base station, base station controller, MSC, VLR, HLR or other sub-system of the first and/or second communications system. It should be understood that the system and portions thereof and of the described architecture can be implemented in or integrated with processing circuitry in the unit or at different locations of the communications system, or in application specific integrated circuits, software-driven processing circuitry, programmable logic devices, firmware, hardware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of converting a first key value for a first communications system to a second key value of a second communications, said method comprising:
   generating a first intermediate value from at least a portion of said first key value using a first random function;
   providing at least a portion of said first intermediate value to a second random function to produce a second value;
   performing an exclusive-or on at least a portion of said first key value and at least a portion of said second value to generate a second intermediate value;
   providing at least a portion of said second intermediate value to a third random function to produce a third value; and
   producing at least a first portion of said second key value by performing an exclusive-or on at least a portion of said third value and at least a portion of said first intermediate value.

2. The method of claim 1 comprising:
   producing at least a portion of said second intermediate value as at least a second portion of said second key value.

3. The method of claim 1 wherein said generating comprises the step of:
   providing said first key value of m bits to a first random function to produce said first intermediate value of n-m bits.

4. The method of claim 3 wherein said first steps of providing and performing comprise:
   providing said n-m bit first intermediate value to a second random function to produce an m bit second value; and
   performing an exclusive-or on said m bit first key value and said m bit second value to generate said second intermediate value with m bits.

5. The method of claim 4 wherein said second step of providing and said step of producing comprise:
   providing said m bit second intermediate value to a third random function to produce a n-m bit third value; and
   performing an exclusive-or on said n-m bit third value and said n-m bit first intermediate value to generate an n-m bit portion of said second key value.

6. The method of claim 5 comprising:
   providing said m bit second intermediate value as an m bit second portion of said second key value having n bits.

7. The method of claim 2 further comprising the steps of:
   providing said second portion of said second key value to said third random function to produce said third value; and
   generating said first intermediate value by subjecting said first portion of said second key value to an exclusive-or with said third value.

8. The method of claim 7 further comprises:
   using said second random function to generate said second value from said first intermediate value; and
   producing at least a portion of said first key by subjecting said second value to an exclusive-or with said second portion of said second key value.

9. The method of claim 6 further comprises:
   providing said m bit first portion of said n bit second key value to said third random function to produce said n-m bit third value; and
   generating said n-m bit first intermediate value using an exclusive-or of said n-m bit second portion of said n bit second key value with said n-m bit third value.

10. The method of claim 9 further comprises:
    providing said n-m first intermediate value to said second random function to generate an m bit second value; and
    producing said portion of said first key value having m bits by using an exclusive-or of said m bit first portion of said second key value with said m bit second value.

11. A key conversion system for converting a first key value for a first communications system to a second key value of a second communications, said system comprising:
    processing circuitry adapted to generate a first intermediate value from at least a portion of said first key value using a first random function to provide at least a portion of said first intermediate value to a second random function to produce a second value, to perform an exclusive-or on at least a portion of said first key value and at least a portion of said second value to generate a second intermediate value, to provide at least a portion of said second intermediate value to a third random function to produce a third value and to produce at least a first portion of said second key value by subjecting at least a portion of said third value to an exclusive-or with at least a portion of said first intermediate value.

12. The system of claim 11 wherein said processing circuitry further configured to produce at least a portion of said second intermediate value as at least a second portion of said second key value.

13. The system of claim 12 wherein said processing circuitry further configured to provide said first key value of m bits to a first random function to produce said first intermediate value of n-m bits.

14. The system of claim 13 wherein said processing circuitry further configured to provide said n-m bit first intermediate value to a second random function to produce an m bit second value and to perform an exclusive-or on said m bit first key value and said m bit second value to generate said second intermediate value with m bits.

15. The system of claim 14 wherein said processing circuitry configured to provide said m bit second intermediate value to a third random function to produce a n-m bit third value and to perform an exclusive-or on said n-m bit third value and said n-m bit first intermediate value to generate an n-m bit portion of said second key value.

16. The system of claim 15 wherein said processing circuitry configured to provide said m bit second intermediate value as an m bit second portion of said second key value having n bits.

17. The system of claim 12 wherein said processing circuitry configured to provide said second portion of said second key value to said third random function to produce said third value and to generate said first intermediate value by subjecting said first portion of said second key value to an exclusive-or with said third value.

18. The system of claim 17 wherein said processing circuitry configured to use said second random function to generate said second value from said first intermediate value and produce at least a portion of said first key by subjecting said second value to an exclusive-or with said second portion of said second key value.

19. The system of claim 16 wherein said processing circuitry configured to provide said m bit first portion of said n bit second key value to said third random function to produce said n-m bit third value and to generate said n-m bit first intermediate value using an exclusive-or of said n-m bit second portion of said n bit second key value with said n-m bit third value.

20. The system of claim 19 wherein said processing circuitry is configured to provide said n-m first intermediate value to said second random function to generate an m bit second value and to produce said portion of said first key value having m bits by using an exclusive-or of said m bit first portion of said second key value with said m bit second value.

* * * * *